(12) United States Patent
Kim et al.

(10) Patent No.: US 9,062,135 B2
(45) Date of Patent: Jun. 23, 2015

(54) MANUFACTURING METHOD OF SOLID CATALYST FOR PROPYLENE POLYMERIZATION

(71) Applicant: SAMSUNG TOTAL PETROCHEMICALS CO., LTD., Seosan-si, Chungcheongnam-do (KR)

(72) Inventors: Sang Yull Kim, Seosan-si (KR); Joon Ryeo Park, Seoul (KR); Eun Il Kim, Daejeon (KR); Jin Woo Lee, Seosan-si (KR)

(73) Assignee: SAMSUNG TOTAL PETROCHEMICALS CO., LTD., Seosan-si (KR)

( * ) Notice: Subject to any disclaimer, the term of this patent is extended or adjusted under 35 U.S.C. 154(b) by 130 days.

(21) Appl. No.: 14/016,537

(22) Filed: Sep. 3, 2013

(65) Prior Publication Data

US 2014/0005038 A1   Jan. 2, 2014

Related U.S. Application Data

(62) Division of application No. 13/514,673, filed as application No. PCT/KR2010/006720 on Oct. 1, 2010, now Pat. No. 8,664,142.

(30) Foreign Application Priority Data

Dec. 8, 2009 (KR) .......................... 10-2009-0121300

(51) Int. Cl.
  *C08F 110/06* (2006.01)
  *C08F 4/64* (2006.01)

(52) U.S. Cl.
  CPC .................................. *C08F 110/06* (2013.01)

(58) Field of Classification Search
  None
  See application file for complete search history.

(56) References Cited

U.S. PATENT DOCUMENTS

| 5,436,213 A | 7/1995 | Iiskola et al. |
| 6,818,583 B1 | 11/2004 | Morini et al. |
| 6,914,153 B2 | 7/2005 | Morini et al. |
| 2005/0080290 A1 | 4/2005 | Gulevich et al. |

FOREIGN PATENT DOCUMENTS

| EP | 1272533 | 9/2008 |
| WO | 02/30998 | 4/2002 |

OTHER PUBLICATIONS

International search report dated Jun. 16, 2011 in corresponding PCT/KR2010006720.

*Primary Examiner* — Yun Qian
(74) *Attorney, Agent, or Firm* — Young & Thompson

(57) ABSTRACT

Disclosed is a method for preparing a solid catalyst for propylene polymerization, specifically to a method for preparing a solid catalyst for propylene polymerization which can produce a polypropylene having high melt flow rate, a wide molecular distribution and excellent stereoregularity with a high production yield.

6 Claims, No Drawings

MANUFACTURING METHOD OF SOLID CATALYST FOR PROPYLENE POLYMERIZATION

TECHNICAL FIELD

The present invention is directed to a method for preparing a solid catalyst for propylene polymerization, specifically to a method for preparing a solid catalyst for propylene polymerization which can produce a polypropylene having high melt flow rate, a wide molecular distribution and excellent stereoregularity with a high production yield.

BACKGROUND OF THE INVENTION

Polypropylene is very useful in industrial point of view and has various industrial applications, particularly it is widely applied to materials used in automobiles and electronic products, etc. for various usages. However, in order to even further broaden the applications of polypropylene, it is still needed to make an improvement in rigidity and processability which can be led by increasing a stereoregularity and widening a molecular weight distribution.

For polymerization of olefins such as propylene or the like, a solid catalyst comprising magnesium, titanium, an electron donor and halogen as essential elements is known in this field of art, and methods for polymerizing or copolymerizing olefins which use a catalyst system comprised of said solid catalyst, an organoaluminum compound and an organosilicon compound have been proposed many. However, such methods are not satisfying in terms of obtaining polymers having high stereoregularity with a high production yield, and thus needed to be improved in the above aspect.

As a method so as to reduce the production cost by increasing the catalyst polymerization activity and improve physical properties of the resulted polymers by improving the catalyst performance such as stereoregularity, it is generally known in this field of art to use diester of aromatic dicarboxylic acid as an internal electron donor and related patent applications have been filed many. For examples, U.S. Pat. No. 4,562,173, U.S. Pat. No. 4,981,930, Korean Patent No. 0072844 and the like. The above patents describe a method for preparing a catalyst showing high activity and stereoregularity by using aromatic dialkyldiesters or aromatic monoalkylmonoesters. However, the methods of said patents cannot provide high stereoregular polymers with a high yield to the satisfying degree and thus still needed to be improved.

There have been many approaches to increase the molecular weight distribution of a polymer. For example, U.S. Pat. No. 6,376,628 B1 proposes a method for broadening the molecular weight distribution by polymerizing propylene by using a solid catalyst component composed of magnesium, titanium, halogen and an electron donor, in the presence of an organoaluminum compound and an isoquinoline silicon compound, and this method is needed to be improved in terms of catalyst activity and flowability.

WO 00/63261 proposes a method for producing polymers having high stereoregularity and wide molecular weight distribution by using succinates as an internal electron donor, however, it fails to disclose an example of using dialkylalkylidene succinate. Further, said method still needs to be improved in molecular weight distribution.

DETAILED DESCRIPTION OF THE INVENTION

The present invention has been developed to solve the problems of prior arts as described above, and thus the purpose of the present invention is to provide a method for preparing a solid catalyst for propylene polymerization which can produce polypropylene simultaneously having high melt flow rate, wide molecular weight distribution and excellent stereoregularity with high production yield.

In order to achieve the purpose of the present invention, the present invention provides a method for preparing a solid catalyst characterized by comprising the following steps:
(1) reacting dialkoxymagnesium and a titanium halide, in the presence of an organic solvent;
(2) adding an internal electron donor selected from the compounds represented by the following formula (II) together with another internal electron donor selected from the compounds represented by the following formula (III) or (IV) to the resulted product from the above step (1), and mixing them together, while elevating the temperature to the range of 80-130° C.,

(wherein, $R^1$, $R^2$, $R^3$ and $R^4$ are independently a linear, branched or cyclic C1-10 alkyl group or hydrogen);

(wherein, $R^1$ and $R^2$ are independently a linear, branched or cyclic C1-10 alkyl group or hydrogen; and $R^3$ and $R^4$ are independently a linear, branched or cyclic C1-10 alkyl group)

(wherein, $R^1$, $R^2$ and $R^4$ are independently a linear, branched or cyclic C1-10 alkyl group or hydrogen; $R^3$ is a linear, branched or cyclic C1-10 alkyl group); and
(3) reacting titanium halide with the resulted product from the above step (2) at the temperature range of 80-130° C. and washing the resulted product.

Although the organic solvent used in the above step (1) is not specifically limited, preferably used may be C6-12 aliphatic, aromatic or halogenated hydrocarbons, more preferably C7-10 saturated aliphatic, aromatic or halogenated hydrocarbons, and for example, at least one selected from the group consisting of octane, nonane, decane, toluene and xylene, chlorobutane, chlorohexane, chloroheptane or the like may be used alone or as a mixture.

The dialkoxymagnesium used in the above step (1) is obtained by reacting metal magnesium with an alcohol anhydride in the presence of magnesium chloride and thus formed as spherical particles having an average particle diameter of 10-200 μm with a smooth surface. Such spherical particle shape is preferred to be remained as it is during the propylene polymerization process. When the average particle size is less than 10 μm, the amount of microparticles are increased in the resulted catalysts and when it is more than 200 μm, bulk density is likely to get smaller, disadvantageously.

Further, the ratio of the organic solvent to dialkoxymagnesium, i.e. dialkoxymagnesium (by weight):organic solvent (by volume) is preferably 1:5-50, more preferably 1:7-20. When the ratio of is less than 1:5, viscosity of the slurry becomes rapidly increased, thereby hindering homogeneous stirring, and when it is more than 1:50, the bulk density of the resulted carrier becomes significantly reduced or the particle surface becomes rough, disadvantageously.

The titanium halides used in the above step (1) of the method for preparing a solid catalyst according to the present invention may be preferably represented as the following formula (I):

$$Ti(OR)_aX_{(4-a)} \quad (I)$$

wherein, R is a C1-10 alkyl group; X is a halogen atom; a is an integer of 0-3 for the atomic valence in the above formula (I). Particularly, titanium tetrachloride is preferably used.

The step (1) of the method for preparing a solid catalyst is preferably carried out by gradually adding titanium halide to the dialkoxymagnesium suspended in the organic solvent at a temperature range of 0° C.-30° C.

The amount of titanium halide used in the above step (1) is preferably 0.1-10 moles, more preferably 0.3-2 moles, based on 1 mole of dialkoxymagnesium. When the amount is less than 0.1 mole, the conversion of dialkoxymagnesium to magnesium chloride does not smoothly proceed, and when the amount is more than 10 moles, an excessive amount of titanium components are present in the resulted catalyst, disadvantageously.

As for the internal electron donor used in the above step (2) of the method for preparing a solid catalyst, a mixture of an internal electron donor selected from the compounds represented by the following formula (II) and another internal electron donor selected from the compounds represented by the following formula (III) or (IV) may be used.

(wherein, $R^1$, $R^2$, $R^3$ and $R^4$ are independently a linear, branched or cyclic C1-10 alkyl group or hydrogen)

(wherein, $R^1$ and $R^2$ are independently a linear, branched or cyclic C1-10 alkyl group or hydrogen; and $R^3$ and $R^4$ are independently a linear, branched or cyclic C1-10 alkyl group)

(wherein, $R^1$, $R^2$ and $R^4$ are independently a linear, branched or cyclic C1-10 alkyl group or hydrogen; $R^3$ is a linear, branched or cyclic C1-10 alkyl group).

As for the examples of the internal electron donor, the followings may be mentioned: diethyl-2,3-dimethylsuccinate, diethyl-2,3-diethylsuccinate, diethyl-2,3-dipropylsuccinate, diethyl-2,3-diisopropylsuccinate, diethyl-2,3-dibutylsuccinate, diethyl-2,3-diisobutylsuccinate, diethyl-2,3-dipentylsuccinate, diethyl-2,3-dihexylsuccinate, diethyl-2,3-dicyclopentylsuccinate, diethyl-2,3-dicyclohexylsuccinate, diethyl-2-cyclopentyl-3-methylsuccinate, diethyl-2-cyclohexyl-3-methylsuccinate, diethyl-2-isopropyl-3-methylsuccinate, diethyl-2-isobutyl-3-methylsuccinate, diethyl-2-cyclopentyl-3-ethylsuccinate, diethyl-2-cyclohexyl-3-ethylsuccinate, diethyl-2-isopropyl-3-ethylsuccinate, diethyl-2-isobutyl-3-ethylsuccinate, diethyl-2-cyclopentyl-3-propylsuccinate, diethyl-2-cyclohexyl-3-propylsuccinate, diethyl-2-isopropyl-3-propylsuccinate, diethyl-2-isobutyl-3-propylsuccinate, diethyl-2-cyclopentyl-3-isopropylsuccinate, diethyl-2-cyclohexyl-3-isopropylsuccinate, diethyl-2-isobutyl-3-isopropylsuccinate, diethyl-2-cyclopentyl-3-isobutylsuccinate, diethyl-2-cyclohexyl-3-isobutylsuccinate, diethyl-2-isopropyl-3-isobutylidenesuccinate, diethyl-2,3-dimethylidenesuccinate, diethyl-2,3-diethylidenesuccinate, diethyl-2,3-dipropylidenesuccinate, diethyl-2,3-diisopropylidenesuccinate, diethyl-2,3-dibutylidenesuccinate, diethyl-2,3-diisobutylidenesuccinate, diethyl-2,3-dipentylidenesuccinate, diethyl-2,3-dihexylidenesuccinate, diethyl-2,3-dicyclopentylidenesuccinate, diethyl-2,3-dicyclohexylidenesuccinate, diethyl-2-cyclopentyl-3-methylidenesuccinate, diethyl-2-cyclohexyl-3-methylidenesuccinate, diethyl-2-isopropyl-3-methylidenesuccinate, diethyl-2-isobutyl-3-methylidenesuccinate, diethyl-2-cyclopentyl-3-ethylidenesuccinate, diethyl-2-cyclohexyl-3-ethylidenesuccinate, diethyl-2-isopropyl-3-ethylidenesuccinate, diethyl-2-isobutyl-3-ethylidenesuccinate, diethyl-2-cyclopentyl-3-propylidenesuccinate, diethyl-2-cyclohexyl-3-propylidenesuccinate, diethyl-2-isopropyl-3-propylidenesuccinate, diethyl-2-isobutyl-3-propylidenesuccinate, diethyl-2-cyclopentyl-3-isopropylidenesuccinate, diethyl-2-cyclohexyl-3-isopropylidenesuccinate, diethyl-2-isobutyl-3-isopropylidenesuccinate, diethyl-2-cyclopentyl-3-isobutylidenesuccinate, diethyl-2-cyclohexyl-3-isobutylidenesuccinate, diethyl-2-isopropyl-3-isobutylidenesuccinate, diethyl-2-cyclopentylidene-3-methylsuccinate, diethyl-2-cyclohexylidene-3-methylsuccinate, diethyl-2-isopropylidene-3-methylsuccinate, diethyl-2-isobutylidene-3-methylsuccinate, diethyl-2-cyclopentylidene-3-ethylsuccinate, diethyl-2-cyclohexylidene-3-ethylsuccinate, diethyl-2-isopropylidene-3-ethylsuccinate, diethyl-2-isobutylidene-3-ethylsuccinate, diethyl-2-cyclopentylidene-3-propylsuccinate, diethyl-2-cyclohexylidene-3-propylsuccinate, diethyl-2-isopropylidene-3-propylsuccinate, diethyl-2-isobutylidene-3-propylsuccinate, diethyl-2-cyclopentylidene-3-isopropylsuccinate, diethyl-2- cyclohexylidene-3-isopropylsuccinate, diethyl-2-isobutylidene-3-isopropylsuccinate, diethyl-2-cyclopentylidene-3-isobutylsuccinate, diethyl-2-cyclohexylidene-3-isobutylsuccinate, diethyl-2-isopropylidene-3-isobutylsuccinate and the like.

The above step (2) is preferably carried out by while gradually increasing the temperature of the product resulted from the step (1) to the range of 80-130° C., adding an internal electron donor mixture thereto and allowing for them to react for 1-3 hours. When the temperature is less than 80° C. or the reaction time is less than 1 hour, the reaction can be hardly completed, and when the temperature is more than 130° C. or the reaction time is more than 3 hours, a side-reaction may occur and lower the polymerization activity of the resulted catalyst or stereoregularity of the resulted polymers.

The temperature or the number of adding an internal electron donor, as long as it is added during the temperature elevation process, is not specifically limited, and the total amount of the internal electron donor used is preferably 0.1-1.0 mole based on 1 mole of dialkoxymagnesium. When the amount is out of said range, the polymerization activity of the resulted catalyst or stereoregularity of the resulted polymers may be decreased disadvantageously.

The step (3) of the solid catalyst preparation process according to the present invention is a process in which the product resulted from the above step (2) secondarily reacts with titanium halide at the temperature range of 80-130° C. As for exemplary titanium halide used in this step, titanium halide having the above general formula (I) may be mentioned. The reactions at each step of the above solid catalyst preparation method are preferably carried out in a reactor equipped with a stirrer from which moisture was sufficiently removed, under nitrogen atmosphere.

The solid catalyst prepared by the above method of the present invention is formed by comprising magnesium, titanium, halogen and an internal electron donor, and preferably comprising magnesium 5-40 wt %, titanium 0.5-10 wt %, halogen 50-85 wt % and an internal electron donor mixture 2.5-30 wt % in terms of the catalyst activity.

The solid catalyst of the present invention may be suitably used in propylene polymerization or copolymerization, and the method for polypropylene (co)polymerization using the solid catalyst obtained by the present invention comprises polymerization of propylene or co-polymerization of propylene with other alpha-olefins in the presence of the solid catalyst, a cocatalyst and an external electron donor.

The solid catalyst may be prepolymerized with ethylene or alpha-olefins before being used as a component of a polymerization reaction.

The prepolymerization reaction may be carried out at a sufficiently low temperature under the pressure of ethylene or alpha-olefin, in the presence of hydrocarbon solvent such as hexane, said catalyst component and organoaluminum compound such as triethylaluminum. The prepolymerization by which catalyst particles are surrounded by polymers so as to maintain the catalyst shape, helps improve the polymer morphology after polymerization. The weight ratio of polymers/catalyst after completion of prepolymerization is preferably about 0.1-20:1.

As a cocatalyst component for the polypropylene (co)polymerization method of the present invention, organometallic compounds belonging to Group II or III of the Periodic table of element may be used, for example alkylaluminum compounds are preferably used. The alkylaluminum compounds are represented by the following formula (V):

$$AlR_3 \quad (V)$$

wherein, R is a C1-8 alkyl group.

As for the specific examples of such alkylaluminum compounds, trimethylaluminum, triethylaluminum, tripropylaluminum, tributylaluminum, triisobutylaluminum and trioctylaluminum or the like may be mentioned.

The ratio of the cocatalyst to the solid catalyst component may be varied depending on a polymerization method used, however the molar ratio of the metal element of the cocatalyst to the titanium element in the solid catalyst component is preferably the range of 1-1000 and more preferably the range of 10-300. When the molar ratio of the metal element, for example such as aluminum in the cocatalyst to the titanium element in the solid catalyst component is out of said range of 1-1000, the polymerization activity is significantly degraded, disadvantageously.

As for the external electron donor used in the method for preparing polypropylene according to the present invention, at least one species of alkoxy silane compounds represented by the following formula (VI) may be used:

$$R^1{}_mR^2{}_nSi(OR^3)_{(4-m-n)} \quad (VI)$$

wherein, $R^1$ and $R^2$, which may be same or different are a linear, branched or cyclic C1-12 alkyl or aryl group; $R^3$ is a linear or branched C1-6 alkyl group; m and n is respectively, 0 or 1; and m+n is 1 or 2.

Specific examples of the external electron donor include the following compounds, and it may be used alone or as a mixture of one or more: n-propyltrimethoxysilane, di-n-propyldimethoxysilane, isopropyltrimethoxysilane, diisopropyldimethoxysilane, n-butyltrimethoxysilane, di-n-butyldimethoxysilane, isobutyltrimethoxysilane, diisobutyldimethoxysilane, tert-butyltrimethoxysilane, di-tert-butyldimethoxysilane, n-pentyltrimethoxysilane, di-n-pentyldimethoxysilane, cyclopentyltrimethoxysilane, dicyclopentyldimethoxysilane, cyclopentylmetyldimethoxysilane, cyclopentylethyldimethoxysilane, cyclopentylpropyldimethoxysilane, cyclohexyltrimethoxysilane, dicyclohexyldimethoxysilane, cyclohexylmetyldimethoxysilane, cyclohexylethyldimethoxysilane, cyclohexylpropyldimethoxysilane, cycloheptyltrimethoxysilane, dicycloheptyldimethoxysilane, cycloheptylmetyldimethoxysilane, cycloheptylethyldimethoxysilane, cycloheptylpropyldimethoxysilane, phenyltrimethoxysilane, diphenyldimethoxysilane, phenylmetyldimethoxysilane, phenylethyldimethoxysilane, phenylpropyldimethoxysilane, n-propyltriethoxysilane, di-n-propyldiethoxysilane, isopropyltriethoxysilane, diisopropyldiethoxysilane, n-butyltriethoxysilane, di-n-butyldiethoxysilane, isobutyltriethoxysilane, diisobutyldiethoxysilane, tert-butyltriethoxysilane, di-tert-butyldiethoxysilane, n-pentyltriethoxysilane, di-n-pentyldiethoxysilane, cyclopentyltriethoxysilane, dicyclopentyldiethoxysilane, cyclopentylmetyldiethoxysilane, cyclopentylethyldiethoxysilane, cyclopentylpropyldiethoxysilane, cyclohexyltriethoxysilane, dicyclohexyldiethoxysilane, cyclohexylmetyldiethoxysilane, cyclohexylethyldiethoxysilane, cyclohexylpropyldiethoxysilane, cycloheptyltriethoxysilane, dicycloheptyldiethoxysilane, cycloheptylmetyldiethoxysilane, cycloheptylethyldiethoxysilane, cycloheptylpropyldiethoxysilane, phenyltriethoxysilane, diphenyldiethoxysilane, phenylmetyldiethoxysilane, phenylethyldiethoxysilane, phenylpropyldiethoxysilane and the like.

The amount of external electron donor may be slightly varied depending on the polymerization method applied thereto, however the molar ratio of the silicon atom in the external electron donor based on the titanium atom in the catalyst component is preferably in the range of 0.1-500 and more preferably 1-100. When the molar ratio of the silicon atom in the external electron donor to the titanium atom in the catalyst component is less than 0.1, stereoregularity of the resulted propylene polymer becomes significantly lowered, disadvantageously, and when it is more than 500, polymerization activity of the catalyst is significantly decreased.

During the propylene polymerization or copolymerization reaction, the polymerization temperature is preferably 20-120° C. When the polymerization temperature is less than 20° C., the polymerization reaction cannot sufficiently proceed, and when it is more than 120° C., the activity is considerably lowered and the physical properties of the resulted polymers is degraded, disadvantageously.

EXAMPLES

Hereinafter, the present invention is further described through the following examples, in detail. However, it should be understood that the examples are only provided on illustrative purposes without any intention to limit the scope of the present invention.

Example 1

1. Preparation of Solid Catalyst

To a 1 L-volume glass reactor of which atmosphere was sufficiently substituted by nitrogen, equipped with a stirrer, 150 ml of toluene and 20 g of spherical-shaped diethoxymagnesium having an average particle size of 20 μm, particle distribution index of 0.86, bulk density of 0.35 g/cc were added, while maintaining the temperature at 10° C. Then, 40 ml of titanium tetrachloride diluted in 60 ml toluene was added thereto over 1 hour, and then thereto a mixture of diethyl-2,3-diisopropylidene succinate 2.9 g and diethyl-2,3-diisopropylsuccinate 2.9 g was added while increasing the reactor temperature to 110° C. After maintaining the temperature at 110° C. for 2 hours and lowering to 90° C., stirring was halted, the supernatant was removed, and the resultant was washed once with additional 200 ml toluene. Thereto, 150 ml toluene and 50 ml titanium tetrachloride were added, and the temperature was raised up to nor and maintained for 2 hours for aging. After completion of the aging process, the mixed slurry was washed twice with 200 ml toluene for each washing, and then washed 5 times at 40° C. with 200 ml n-hexane for each washing, thereby obtaining a pale yellow solid catalyst component. The obtained catalyst component was dried for 18 hours under a nitrogen stream, and the titanium content in the resulted solid catalyst component was 3.3 wt %.

2. Polypropylene Polymerization

Into a 4 L-volume high-pressure stainless reactor, 10 mg of thus obtained solid catalyst, 6.6 mmol of triethylaluminum and 0.66 mmol of dicyclopentyldimethoxysilane were added. Next, 1000 ml of hydrogen and 2.4 L of liquid propylene were added in this order and polymerization was carried out at an elevated temperature of 70° C. After 2 hours from the start of polymerization, the remaining propylene inside the reactor was completely removed by opening the valve, while lowering the reactor temperature to room temperature.

Analysis of thus resulted polymer was carried out and the results were represented in Table 1.

The catalyst activity, stereoregularity, melt flow rate and molecular weight distribution were determined by the following method.

① Catalyst activity (kg-PP/g-cat)=the amount of polymers produced (kg)÷the amount of catalyst used (g)

② Stereoregularity (X.I.): the amount of insolubles crystallized and precipitated in mixed xylene solvent (wt %)

③ Melt flow rate (MFR): measured at 230° C. under 2.16 kig load, according to ASTM 1238

④ Molecular weight distribution (P.I.): determined by applying a modulation separation value obtained from a parallel plate rheometer at 200° C. to the following equation:

$$P.I.=54.6\times(\text{modulus separation value})^{-1.76}$$

Example 2

A catalyst was prepared according to the method described in Example 1 except that a mixture of diethyl-2,3-diisopropylidenesuccinate 2.3 g and diethyl-2,3-diisopropylsuccinate 3.5 g was used, instead of a mixture of diethyl-2,3-diisopropylidenesuccinate 2.9 g and diethyl-2,3-diisopropylsuccinate 2.9 g in the above item 1. Preparation of solid catalyst. The titanium content of the resulted solid catalyst component was 3.2 wt %. Next, propylene polymerization was carried out by the same method as in Example 1, and the result was represented in Table 1.

Example 3

A catalyst was prepared according to the method described in Example 1 except that a mixture of diethyl-2,3-diisopropylidenesuccinate 1.4 g and diethyl-2,3-diisopropylsuccinate 4.3 g was used, instead of a mixture of diethyl-2,3-diisopropylidenesuccinate 2.9 g and diethyl-2,3-diisopropylsuccinate 2.9 g in the above item 1. Preparation of solid catalyst. The titanium content of the resulted solid catalyst component was 3.1 wt %. Next, propylene polymerization was carried out by the same method as in Example 1, and the result was represented in Table 1.

Example 4

A catalyst was prepared according to the method described in Example 1 except that a mixture of diethyl-2-isopropylidene-3-isopropylsuccinate 2.9 g and diethyl-2,3-diisopropylsuccinate 2.9 g was used, instead of a mixture of diethyl-2,3-diisopropylidenesuccinate 2.9 g and diethyl-2,3-diisopropylsuccinate 2.9 g in the above item 1. Preparation of solid catalyst. The titanium content of the resulted solid catalyst component was 3.1 wt %. Next, propylene polymerization was carried out by the same method as in Example 1, and the result was represented in Table 1.

Comparative Example 1

1. Preparation of Solid Catalyst

To a 1 L-volume glass reactor of which atmosphere was sufficiently substituted by nitrogen, equipped with a stirrer, 150 ml of toluene, 12 ml of tetrahydrofuran, 20 ml of butanol and 21 g of magnesium chloride were added, and the temperature was raised to 110° C. and maintained for 1 hour, thereby obtaining a homogenous solution. The resulted solution was cooled to 15° C., then added with 25 ml titanium tetrachloride, and then, the reactor temperature was raised to 60° C. over 1 hour. After aging for 10 minutes, the mixture was stood still for 15 minute so as to precipitate the carriers, and the supernatant was removed. To the slurry remained in the reactor, 200 ml toluene was added, and stirring, allowing to stand still and removal of the supernatant was carried out twice for washing.

To the resulted slurry, 150 ml toluene was added, then 25 ml titanium tetrachloride diluted in 50 ml toluene was further added at 15° C. over 1 hour, and the reactor temperature was elevated to 30° C. at the speed of 0.5° C. per minute. The reaction mixture was maintained at 30° C. for 1 hour, 7.5 ml of diisobutylphthalate was added, and then its temperature was elevated to 110° C. at the speed of 0.5° C. per minute.

After maintaining the temperature at 110° C. for 1 hour and lowering to 90° C., stirring was halted, the supernatant was removed, and the resultant was washed once with additional 200 ml toluene in the same way. Thereto, 150 ml toluene and 50 ml titanium tetrachloride were added, and the temperature was raised to nor and maintained for 1 hours for aging. After completion of the aging process, the mixed slurry was washed twice with 200 ml toluene for each washing, and then washed 5 times at 40° C. with 200 ml n-hexane for each washing, thereby obtaining a pale yellow solid catalyst component. The obtained catalyst component was dried for 18 hours under a nitrogen stream, and the titanium content in the resulted solid catalyst component was 3.3 wt %.

2. Polypropylene Polymerization

Polymerization was carried out according to the method described in Example 1 except using the above-obtained solid catalyst 10 mg, and the result was represented in Table 1.

Comparative Example 2

A catalyst was prepared according to the method described in Example 1 except that diethyl-2,3-diisopropylsuccinate 5.8 g was used, instead of a mixture of diethyl-2,3-diisopropylidenesuccinate 2.9 g and diethyl-2,3-diisopropylsuccinate 2.9 g in the above item 1. Preparation of solid catalyst. The titanium content of the resulted solid catalyst component was 2.8 wt %. Next, propylene polymerization was carried out by the same method as in Example 1, and the result was represented in Table 1.

Comparative Example 3

A catalyst was prepared according to the method described in Example 1 except that diethyl-2-cyclohexylsuccinate 4.8 g was used, instead of a mixture of diethyl-2,3-diisopropylidenesuccinate 2.9 g and diethyl-2,3-diisopropylsuccinate 2.9 g in the above item 1. Preparation of solid catalyst. The titanium content of the resulted solid catalyst component was 3.8 wt %. Next, propylene polymerization was carried out by the same method as in Example 1, and the result was represented in Table 1.

TABLE 1

|  | Activity (kg-PP/g-Cat) | Stereoregularity (X.I., wt. %) | Melt Flow Rate (MFR, g/10 min) | Molecular weight distribution (P.I.) |
|---|---|---|---|---|
| Example 1 | 42.0 | 98.0 | 2.2 | 7.0 |
| Example 2 | 44.8 | 98.5 | 1.9 | 6.9 |
| Example 3 | 45.9 | 98.6 | 1.7 | 6.8 |
| Example 4 | 40.8 | 97.8 | 3.0 | 7.5 |
| Com. Example 1 | 26.0 | 97.3 | 5.6 | 4.8 |
| Com. Example 2 | 45.5 | 98.5 | 0.8 | 6.3 |
| Com. Example 3 | 22.7 | 97.8 | 2.5 | 5.0 |

As seen from the above Table 1, Examples 1-4 according to the present invention show high catalyst activity and stereoregularity, excellent melt flow rate and wide molecular weight distribution, whereas Comparative example 1 and 3 show significantly low catalyst activity and narrow molecular weight distribution; and Comparative example 2 shows narrow molecular weight distribution and poor melt flow rate as compared to the results of Examples 1-4 according to the present invention.

INDUSTRIAL APPLICABILITY

By using the solid catalyst prepared according to the method of the present invention, it is possible to prepare polypropylene having high melt flowability, wide molecular weight distribution and excellent stereoregularity with a high production yield.

What is claimed is:
1. A method for preparing a solid catalyst comprising the following steps:
  (1) reacting dialkoxymagnesium and a titanium halide, in the presence of an organic solvent;
  (2) adding an internal electron donor selected from the compounds represented by the following formula (II) together with another internal electron donor selected from the compounds represented by the following formula (IV) to the resulted product from the above step (1), and mixing them together, while elevating the temperature to a range of 80-130° C.,

(II)

wherein, $R^1$, $R^2$, $R^3$ and $R^4$ are independently a linear, branched or cyclic C1-10 alkyl group or hydrogen;

(IV)

wherein, $R^1$, $R^2$ and $R^4$ are independently a linear, branched or cyclic C1-10 alkyl group or hydrogen; $R^3$ is a linear, branched or cyclic C1-10 alkyl group; and
  (3) reacting titanium halide with the resulted product from the above step (2) at a temperature range of 80-130° C., and washing the resulted product.
2. The method according to claim 1, wherein the solid catalyst comprises:
  5-40 wt % magnesium,
  0.5-10 wt % titanium, 50-85 wt % halogen, and 2.5-30 wt % of the internal electron donor mixture, calculated based on total weight of the solid catalyst.

3. The method according to claim 1, wherein the internal electron donor is selected from the group consisting of: diethyl-2,3-dimethylsuccinate, diethyl-2,3-diethylsuccinate, diethyl-2,3-dipropylsuccinate, diethyl-2,3-diisopropylsuccinate, diethyl-2,3-dibutylsuccinate, diethyl-2,3-diisobutylsuccinate, diethyl-2,3-dipentylsuccinate, diethyl-2,3-dihexylsuccinate, diethyl-2,3-dicyclopentylsuccinate, diethyl-2,3-dicyclohexylsuccinate, diethyl-2-cyclopentyl-3-methylsuccinate, diethyl-2-cyclohexyl-3-methylsuccinate, diethyl-2-isopropyl-3-methylsuccinate, diethyl-2-isobutyl-3-methylsuccinate, diethyl-2-cyclopentyl-3-ethylsuccinate, diethyl-2-cyclohexyl-3-ethylsuccinate, diethyl-2-isopropyl-3-ethylsuccinate, diethyl-2-isobutyl-3-ethylsuccinate, diethyl-2-cyclopentyl-3-propylsuccinate, diethyl-2-cyclohexyl-3-propylsuccinate, diethyl-2-isopropyl-3-propylsuccinate, diethyl-2-isobutyl-3-propylsuccinate, diethyl-2-cyclopentyl-3-isopropylsuccinate, diethyl-2-cyclohexyl-3-isopropylsuccinate, diethyl-2-isobutyl-3-isopropylsuccinate, diethyl-2-cyclopentyl-3-isobutylsuccinate, diethyl-2-cyclohexyl-3-isobutylsuccinate, diethyl-2-isopropyl-3-isobutylidenesuccinate, diethyl-2-cyclopentyl-3-methylidenesuccinate, diethyl-2-cyclohexyl-3-methylidenesuccinate, diethyl-2-isopropyl-3-methylidenesuccinate, diethyl-2-isobutyl-3-methylidenesuccinate, diethyl-2-cyclopentyl-3-ethylidenesuccinate, diethyl-2-cyclohexyl-3-ethylidenesuccinate, diethyl-2-isopropyl-3-ethylidenesuccinate, diethyl-2-isobutyl-3-ethylidenesuccinate, diethyl-2-cyclopentyl-3-propylidenesuccinate, diethyl-2-cyclohexyl-3-propylidenesuccinate, diethyl-2-isopropyl-3-propylidenesuccinate, diethyl-2-isobutyl-3-propylidenesuccinate, diethyl-2-cyclopentyl-3-isopropylidenesuccinate, diethyl-2-cyclohexyl-3-isopropylidenesuccinate, diethyl-2-isobutyl-3-isopropylidenesuccinate, diethyl-2-cyclopentyl-3-isobutylidenesuccinate, diethyl-2-cyclohexyl-3-isobutylidenesuccinate, diethyl-2-isopropyl-3-isobutylidenesuccinate, diethyl-2-cyclopentylidene-3-methylsuccinate, diethyl-2-cyclohexylidene-3-methylsuccinate, diethyl-2-isopropylidene-3-methylsuccinate, diethyl-2-isobutylidene-3-methylsuccinate, diethyl-2-cyclopentylidene-3-ethylsuccinate, diethyl-2-cyclohexylidene-3-ethylsuccinate, diethyl-2-isopropylidene-3-ethylsuccinate, diethyl-2-isobutylidene-3-ethylsuccinate, diethyl-2-cyclopentylidene-3-propylsuccinate, diethyl-2-cyclohexylidene-3-propylsuccinate, diethyl-2-isopropylidene-3-propylsuccinate, diethyl-2-isobutylidene-3-propylsuccinate, diethyl-2-cyclopentylidene-3-isopropylsuccinate, diethyl-2-cyclohexylidene-3-isopropylsuccinate, diethyl-2-isobutylidene-3-isopropylsuccinate, diethyl-2-cyclopentylidene-3-isobutylsuccinate, diethyl-2-cyclohexylidene-3-isobutylsuccinate and diethyl-2-isopropylidene-3-isobutylsuccinate.

4. The method according to claim 1, wherein the amount of the internal electron donor used is 0.1-1.0 mole based on 1 mole of the dialkoxymagnesium.

5. The method according to claim 2, wherein the amount of the internal electron donor used is 0.1-1.0 mole based on 1 mole of the dialkoxymagnesium.

6. The method according to claim 3, wherein the amount of the internal electron donor used is 0.1-1.0 mole based on 1 mole of the dialkoxymagnesium.

* * * * *